(12) United States Patent
Thirumale

(10) Patent No.: US 10,929,096 B2
(45) Date of Patent: Feb. 23, 2021

(54) SYSTEMS AND METHODS FOR HANDLING APPLICATION NOTIFICATIONS

(71) Applicant: Google LLC, Mountain View, CA (US)

(72) Inventor: Venkatesh Thirumale, Saugus, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/674,225

(22) Filed: Nov. 5, 2019

(65) Prior Publication Data

US 2020/0073626 A1 Mar. 5, 2020

Related U.S. Application Data

(63) Continuation of application No. 15/349,079, filed on Nov. 11, 2016, now Pat. No. 10,503,462, which is a continuation of application No. 15/349,051, filed on Nov. 11, 2016, now Pat. No. 10,255,030, which is a
(Continued)

(51) Int. Cl.
| | |
|---|---|
| *G06F 17/00* | (2019.01) |
| *G06F 3/16* | (2006.01) |
| *G01C 21/36* | (2006.01) |
| *G10L 25/48* | (2013.01) |

(52) U.S. Cl.
CPC ......... *G06F 3/165* (2013.01); *G01C 21/3629* (2013.01); *G06F 3/167* (2013.01); *G10L 25/48* (2013.01)

(58) Field of Classification Search
CPC ..... G06F 3/165; G06F 3/167; G01C 21/3629; G10L 25/48
See application file for complete search history.

(56) References Cited

U.S. PATENT DOCUMENTS

| | | |
|---|---|---|
| 4,328,543 A | 5/1982 | Brickman et al. |
| 7,558,635 B1 | 7/2009 | Thiel et al. |
| 8,280,541 B1 | 10/2012 | Chen |
| | (Continued) | |

OTHER PUBLICATIONS

Notice of Allowance dated Nov. 29, 2018 in U.S. Appl. No. 15/349,051.
(Continued)

*Primary Examiner* — Simon King
(74) *Attorney, Agent, or Firm* — Lerner, David, Littenberg, Krumholz & Mentlik, LLP

(57) ABSTRACT

Certain implementations of the disclosed technology may include systems and method for handling application notifications. According to an example implementation, a method is provided. The method can include receiving a plurality of audio feeds from a respective plurality of applications, and determining a priority status for one or more of the respective applications. Based on the determined priority status, the method may further include determining a first prioritized audio feed and a second prioritized audio feed from the plurality of applications. The method includes detecting, in a signal associated with the first prioritized audio feed, a signal gap having a gap start. The method includes modifying, based at least in part on the signal of the first prioritized audio feed, one or more parameters associated with at least the second prioritized audio feed, and outputting, to an output device, at least a portion of the first prioritized audio feed.

17 Claims, 6 Drawing Sheets

Related U.S. Application Data continuation of application No. 13/872,266, filed on Apr. 29, 2013, now Pat. No. 9,523,585.

(60) Provisional application No. 61/793,611, filed on Mar. 15, 2013.

(56) References Cited

U.S. PATENT DOCUMENTS

| | | | |
|---|---|---|---|
| 8,312,096 | B2 | 11/2012 | Cohen et al. |
| 8,346,279 | B1 * | 1/2013 | Saatchi .................. G01S 19/09 |
| | | | 455/456.1 |
| 8,755,921 | B2 | 6/2014 | Hamilton et al. |
| 2002/0097842 | A1 * | 7/2002 | Guedalia ............ G06Q 30/0241 |
| | | | 379/67.1 |
| 2006/0023665 | A1 | 2/2006 | Zellner et al. |
| 2007/0072647 | A1 | 3/2007 | Mousseau et al. |
| 2007/0171823 | A1 | 7/2007 | Hunt et al. |
| 2007/0266168 | A1 | 11/2007 | Sampat et al. |
| 2008/0032663 | A1 * | 2/2008 | Doyle .................. H04H 20/106 |
| | | | 455/345 |
| 2009/0055088 | A1 * | 2/2009 | Zhang ............... H04M 1/72572 |
| | | | 701/533 |
| 2009/0088168 | A1 | 4/2009 | Varanasi |
| 2010/0063726 | A1 | 3/2010 | Marjenberg et al. |
| 2011/0218711 | A1 | 9/2011 | Mathur et al. |
| 2012/0306637 | A1 | 12/2012 | McGough et al. |
| 2013/0007665 | A1 | 1/2013 | Chaudhri et al. |
| 2013/0322634 | A1 | 12/2013 | Bennett et al. |
| 2013/0322665 | A1 | 12/2013 | Bennett et al. |
| 2014/0136187 | A1 | 5/2014 | Wolverton et al. |
| 2014/0226532 | A1 | 8/2014 | Abbate |
| 2015/0296243 | A1 | 10/2015 | Ikeda et al. |

OTHER PUBLICATIONS

Office Action dated Nov. 12, 2015 in U.S. Appl. No. 13/872,266.
Office Action dated Jun. 3, 2016 in U.S. Appl. No. 13/872,266.
Notice of Allowance dated Aug. 16, 2016 in U.S. Appl. No. 13/872,266.
Office Action dated Apr. 19, 2018 in U.S. Appl. No. 15/349,051.

* cited by examiner

SYSTEMS AND METHODS FOR HANDLING APPLICATION NOTIFICATIONS

CROSS REFERENCE TO RELATED APPLICATION

This application is a continuation of U.S. application Ser. No. 15/349,079, filed Nov. 11, 2016, which is a continuation of U.S. application Ser. No. 15/349,051, filed Nov. 11, 2016, now U.S. Pat. No. 10,255,030, which is a continuation of U.S. application Ser. No. 13/872,266, filed Apr. 29, 2013, now U.S. Pat. No. 9,523,585, which claims the benefit of U.S. Provisional Patent Application No. 61/793,611, filed Mar. 15, 2013. The entire contents of which are incorporated by reference within.

BACKGROUND

Modern mobile computing devices have the ability to run several applications simultaneously. Certain applications may generate audible notifications using the mobile computing device's audio circuitry. When multiple running applications provide notifications at the same time, the information can be difficult to understand. For example, if a user is having a phone conversation on his or her smart phone while driving, the navigation application may be running at the same time. A typical navigation application may provide audible turn-by-turn instructions, thereby interfering with the simultaneous phone conversation, and vice-versa. Often this type of "audible stream collision" can make it difficult for a listener to comprehend the audible notification(s) and/or the phone conversation.

SUMMARY

Some or all of the above needs may be addressed by certain implementations of the disclosed technology. Certain implementations may include systems and methods for handling application notifications. An example method is provided that can include receiving a plurality of audio feeds from a respective plurality of applications, and determining a priority status for one or more of the respective applications. Based on the determined priority status, the method may further include determining a first prioritized audio feed and a second prioritized audio feed from the plurality of applications. The method includes detecting, in a signal associated with the first prioritized audio feed, a signal gap having a gap start; modifying, based at least in part on the signal of the first prioritized audio feed, one or more parameters associated with at least the second prioritized audio feed; and outputting, to an output device, at least a portion of the first prioritized audio feed.

According to another example implementation, a system is provided. The system includes a memory for storing data and computer-executable instructions, an audio output device, and at least one processor in communication with the audio output device and configured to access the at least one first memory. The at least one processor is further configured to execute the computer-executable instructions to cause the system to receive a plurality of audio feeds from a respective plurality of applications, and determine a priority status for one or more of the respective applications. Based on the determined priority status, the system may determine a first prioritized audio feed and a second prioritized audio feed from the plurality of applications; detect, in a signal associated with the first prioritized audio feed, a signal gap having a gap start; modify, based at least in part on the signal of the first prioritized audio feed, one or more parameters associated with at least the second prioritized audio feed; and output, to the audio output device, at least a portion of the first prioritized audio feed.

According to another example implementation of the disclosed technology, a computer-readable medium is provided that stores instructions executable by one or more processors to perform a method. The method includes receiving a plurality of audio feeds from a respective plurality of applications, and determining a priority status for one or more of the respective applications. Based on the determined priority status, the method may further include determining a first prioritized audio feed and a second prioritized audio feed from the plurality of applications. The method includes detecting, in a signal associated with the first prioritized audio feed, a signal gap having a gap start; modifying, based at least in part on the signal of the first prioritized audio feed, one or more parameters associated with at least the second prioritized audio feed; and outputting, to an output device, at least a portion of the first prioritized audio feed.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
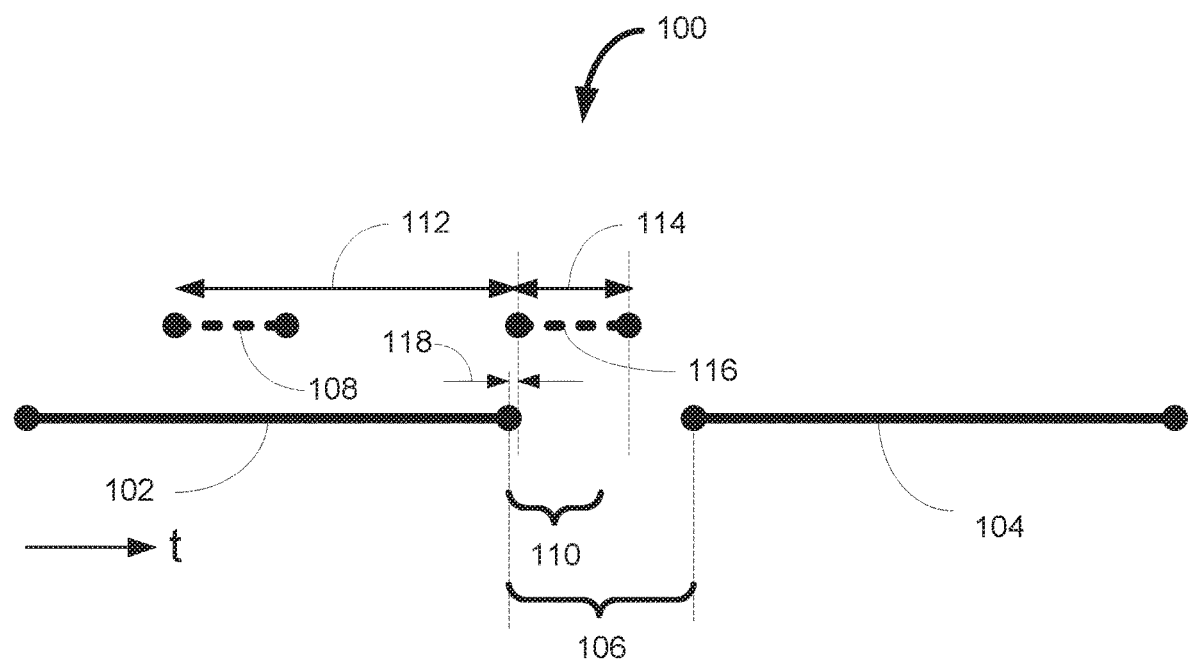
FIG. 1A is an illustrative diagram 100 depicting a delay of a second prioritized audio feed according to an example implementation of the disclosed technology.

Some implementations of the disclosed technology will be described more fully hereinafter with reference to the accompanying drawings. This disclosed technology may, however, be embodied in many different forms and should not be construed as limited to the implementations set forth herein.

In certain example implementations of the disclosed technology, a plurality of notifications and/or audio feeds may be prioritized, monitored and/or controlled to enhance the intelligibility of the notifications and/or audio feeds. According to certain example implementations, the notifications and/or audio feeds may include, without limitation, sound notifications, visual notifications, sound stream sources, audible alerts, signals, telephone conversations, music etc.

According to example implementations, a plurality of notifications and/or audio feeds associated with a respective plurality of applications may be prioritized such that when two or more audio feeds/notifications present simultaneous output (for example, audible signals that may overlap in time), one or more of the simultaneous audio feeds/notifications may be modified based at least in part on the prioritization. According to certain example implementations, lower priority audio feeds/notifications may be delayed until a gap is detected in a higher priority audio feed. According to certain example implementations, lower priority audio feeds/notifications may be compressed in time to play back at a higher speed. Certain example implementations of the disclosed technology may utilize a sound controller to monitor, delay, compress in time, compress in amplitude, modify volume levels, route signals for output, and control various other parameters associated with the plurality of notifications.

In one example embodiment, the sound controller may be part of the operating system of the computing device. In one example implementation, all applications running on the mobile device that produce audible notifications may pass such signals through the sound controller module.

In one example implementation, the sound controller module may be utilized in conjunction with a user interface to allow input from the user for setting notification priorities, mutes, alternate signaling, etc. In an example implementation, the sound controller module may be configured to prioritize certain notifications. In yet another example embodiment, as described above, the sound controller module may delay and/or compress certain notifications to avoid "collisions." For example, if a navigation notification (audible turn direction, for example) becomes available during a phone conversation, the sound controller module may sense a gap in the voice conversation and allow the delayed notification. In another embodiment, if the voice conversation resume before the application notification has finished, the sound controller module may delay part of the received voice conversation so that both do not activate the speaker, earphones, etc., at the same time. In yet another example embodiments, the sound controller may time compress portions of one or more audio streams so that only one audio stream activates the speakers at the same time.

In an example implementation, the sound controller module may utilize a number of different alternative notification methods such as partial mutes, alternate signaling, etc. For example, if two or more applications are present with sound, sounds may be directed to other available sources, such as a car speaker system via Bluetooth. In certain example embodiments, prioritization may be based on sensing. In other example embodiments, a user interface may allow the user to control which audio feeds/notifications make it through based on the priority of each app, etc. In one example implementation, if there is an application running (such as navigation) that is attempting to provide an alert while another application is utilizing the sound channel (such as a user talking on the phone), then other signaling methods may be utilized to take advantage of the existing signaling channels on the mobile device, including vibration, tone, flashing the display, etc. to provide the notification that another application is wanting to send notification information.

As an illustrative example, a voice channel (for example, set at priority 1) may be configured to decrease a volume of the navigation (priority 2) by 50% and decrease the music, volume (priority 3) to 0% when the voice channel is active. In this example, if the voice channel (priority 1) is inactive, and navigation (priority 2) is active, the navigation channel may be set with a volume output that is 100%, but the music (priority 3) may be muted (0%) because the higher priority channel is active.

Certain example embodiments of the disclosed technology may provide collision avoidance of two or more audio feeds. For example, in an illustrative embodiment, consider a situation where a user is conducting a telephone conversation with another party on a mobile computing device while driving a vehicle. In this situation, it is likely that the navigation application on the mobile computing device is operational and providing audible turn by turn instructions. When the audible instructions are output at the same time as the third party is attempting to speak, the intelligibility of the phone conversation may be compromised due to the intruding navigation instructions, and vice versa. According to certain example implementations of the disclosed technology, a lower priority audio feed (for example, in this case, navigation instructions) may be delayed and/or time compressed until a gap in the higher priority audio feed (for example, the phone conversation) has been detected. According to certain example implementations of the disclosed technology, various timeout thresholds, GPS coordinates, and other information may be utilized to temporarily alter the priority of the audio, as will be explained below with reference to the accompanying figures.

In this description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The terms "and/or" and "or" are intended to be inclusive. Further, the terms "a," "an," and "the" are intended to mean one or more unless specified otherwise or clear from the context to be directed to a singular form.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a processor combined with one or more additional hardware components.

Various techniques described herein may be used to control audible notifications, sounds, audio feeds, etc. The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

In some instances, a graphical user interface may be referred to as an object-oriented user interface, an application oriented user interface, a web-based user interface, a touch-based user interface, or a virtual keyboard. A presence-sensitive input device as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Figure 3:
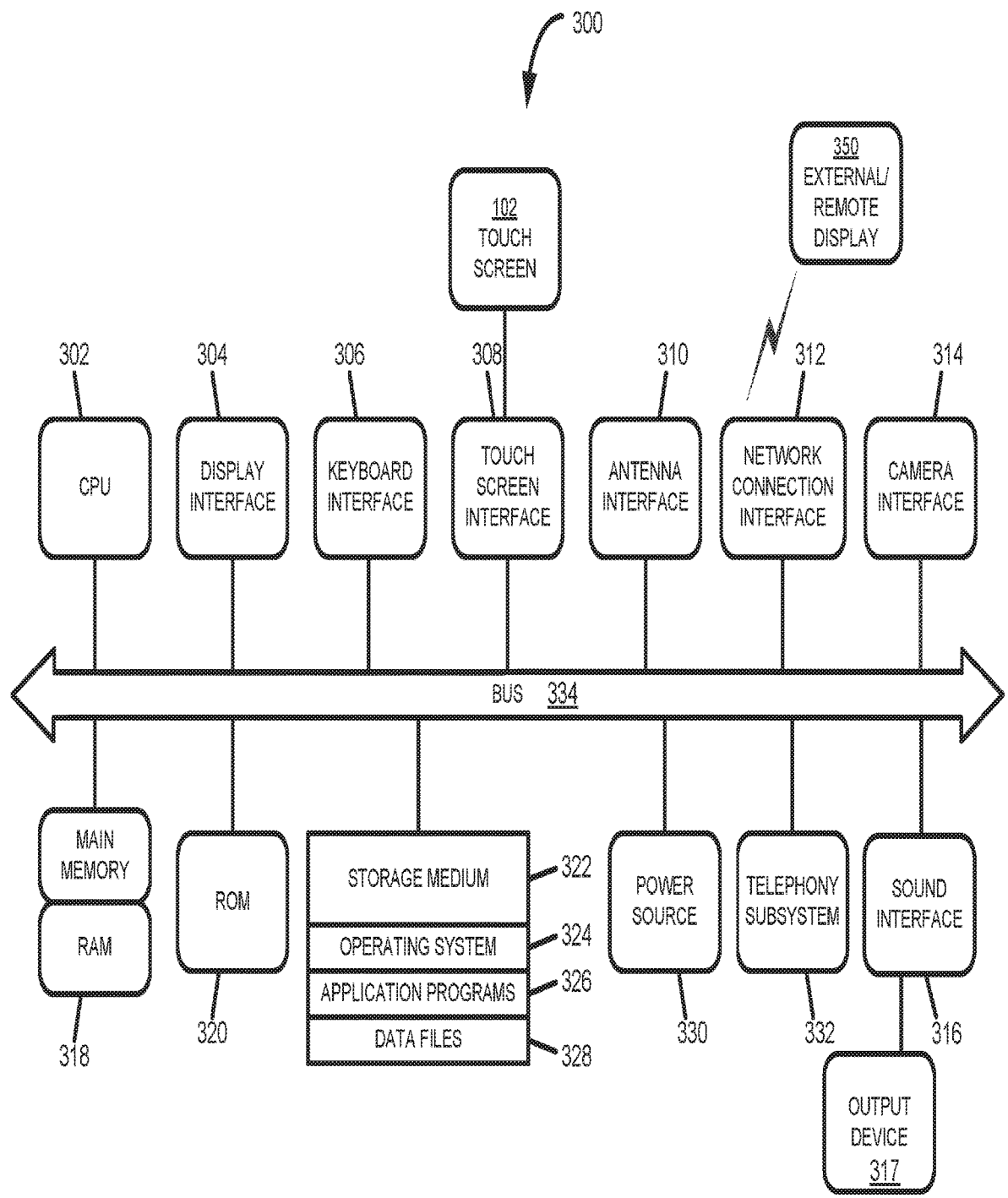
FIG. 3 is a block diagram of an illustrative computing device 300 or processor and associated peripheral devices, according to an example implementation.

According to one example implementation, the terms computing device or mobile computing device, as used herein, may be a CPU, or conceptualized as a CPU (for example, the CPU 302 of FIG. 3). In certain example implementations, the computing device (CPU) may be coupled, connected, and/or in communication with one or more peripheral devices, such as display, navigation system, stereo, entertainment center, Wi-Fi access point, etc. In another example implementation, the term computing device or mobile computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the mobile computing device may output content to its local display and/or speaker(s). In another example implementation, mobile computing device may output content to an external display device (e.g., over Wi-Fi) such as a TV or an external computing system.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various implementations may be utilized for handling application notifications and sounds, according to example implementations of the disclosed technology, and will now be described with reference to the accompanying figures.

FIG. 1A is an illustrative diagram depicting a delay of an audio feed according to an example implementation of the disclosed technology. For example, a first prioritized audio feed is shown with respect to time, from left to right. The first prioritized audio feed may include a signal that has a first portion 102 and a second portion 104, separated by a gap 106. In accordance with an example implementation, the first portion 102, second portion 104, and the gap of first prioritized audio feed may be defined by the signal content. For example, the first prioritized audio feed 102, 104 may be a two-way telephone conversation. In the first portion 102, a relatively constant audio signal may be monitored with little or no gaps in the conversation. Then a gap 106, or pause may occur in the conversation, followed by second portion 104 of the first prioritized audio feed.

FIG. 1A also depicts a second prioritized audio feed 108 that overlaps in time with the first portion 102 of the first prioritized audio feed. The second prioritized audio feed 108, for example, may represent a navigation notification. In an example embodiment, the second prioritized audio feed may be delayed to avoid overlapping with the first prioritized audio feed, for example, the first portion 102. According to an example implementation of the disclosed technology, the first prioritized audio feed 102, 104 may be monitored to detect a gap 106 that is greater than a minimum gap duration 110, and in response to detecting the gap 106, may output the delay or modified second prioritized audio feed 116 within the detected gap 106.

As show in this figure, a delay time value 112 may be applied to the second prioritized audio feed 108 portion so that be the beginning of the second prioritized audio feed 108 portion corresponds approximately with the end of the first prioritized audio feed first portion 102. It should be noted also in this figure that the duration 114 of the modified second prioritized audio feed 116 is depicted to be less than duration of the gap 106 associated with the first prioritized audio feed. It should also be noted that the beginning of the second prioritized audio feed 108 portion may start a short period of time 118 after the end of the first prioritized audio feed first portion 102. It should also be noted that this illustration may represent a best case scenario, and other measures may need to be taken into account when the gap 106 duration of the first prioritized audio feed is shorter than the duration 114 of the modified second prioritized audio feed 116, as will be explained below, with respect to FIG. 1B and FIG. 1C.

Figure 1B:
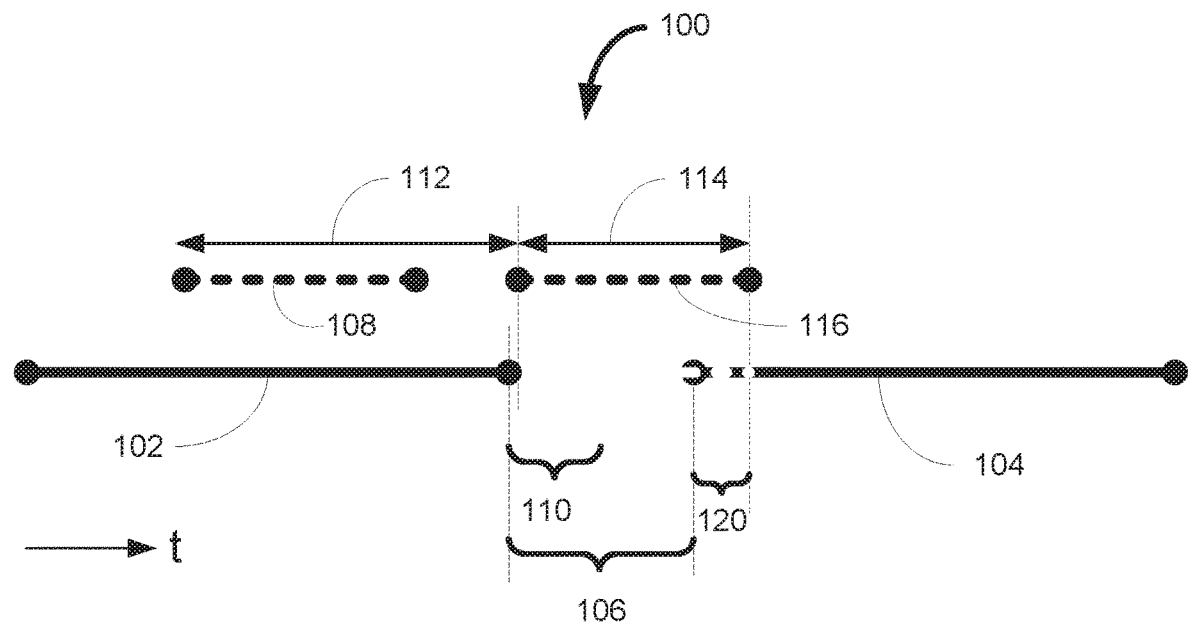
FIG. 1B is another illustrative diagram 100 depicting a delay of a second prioritized audio feed according to an example implementation of the disclosed technology.

FIG. 1B is another illustrative diagram depicting a delay of a second prioritized audio feed according to an example implementation of the disclosed technology. In this example, illustration, the duration 114 of the modified second prioritized audio feed 116 is shown to be longer than the duration of the gap 106 associated with the first prioritized audio feed. In this example diagram, modified (delayed) second prioritized audio feed 116 overlaps the second portion 104 of the prioritized audio feed by an overlap portion 120. In this example embodiment, the overlap portion 120 may be utilized to control portions of the various audio feeds 116, 104. For example, in one implementation, the second portion 104 of the first prioritized audio feed may be delayed by the overlap portion 120. In another implementation, the overlap portion 120 corresponding to the second portion 104 of the first prioritized audio feed may be utilized to control, reroute, adjust the relative volumes, etc., of the second portion 104 of the first prioritized audio feed and/or the overlapping portion associated with the modified second prioritized audio feed 116.

Figure 1C:
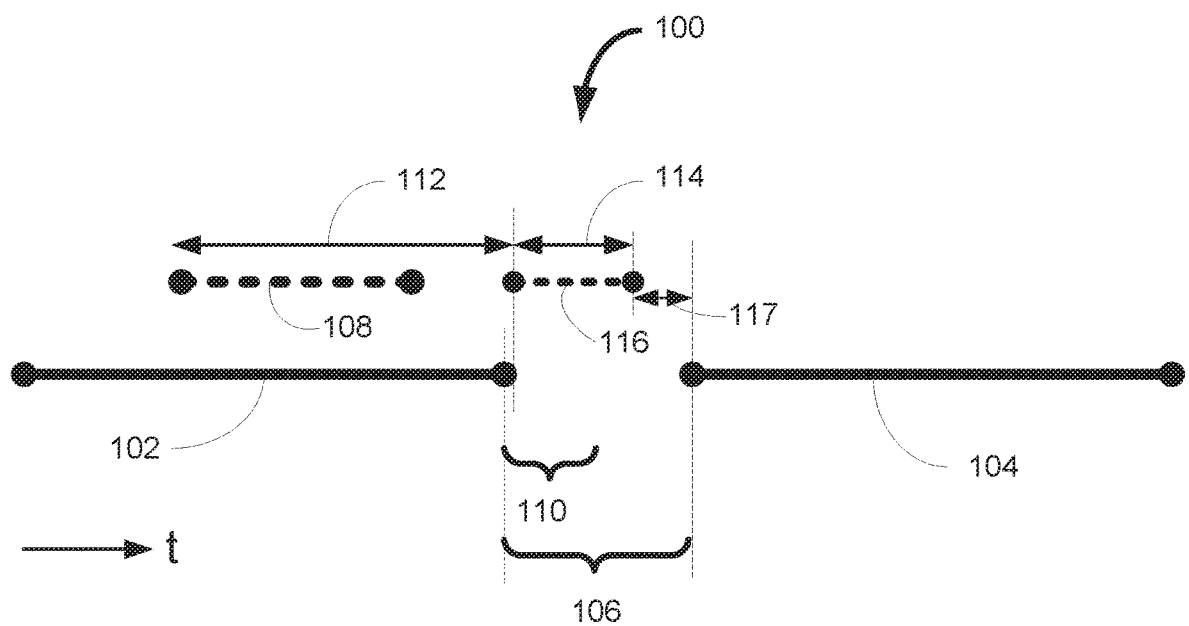
FIG. 1C is an illustrative diagram 100 depicting a delay and time compression of a second prioritized audio feed according to an example implementation of the disclosed technology.

FIG. 1C is another illustrative diagram depicting a delay of a second prioritized audio feed 108 plus a time compression 117 of the second prioritized audio feed according to an example implementation of the disclosed technology. In this example, illustration, the duration 114 of the modified second prioritized audio feed 116 is shown compressed (in time) to be shorter in duration than the duration of the gap 106 associated with the first prioritized audio feed. In this example diagram, the modified (delayed and time compressed) second prioritized audio feed 116 may be time compressed so that it does not overlap with the second portion 104 of the prioritized audio feed.

In an example embodiment, time compression may be applied to the modified second prioritized audio feed 116, as shown, with a time compression 117. In another example implementation, the second portion 104 of the first prioritized audio feed may be compressed to prevent overlap of the two audio feeds 116 104. In yet another example implementation, time compression may be applied to multiple audio streams to force a gap 106 in which a delayed second prioritized audio feed 116 may be played without overlapping with the first portion 102 or the second portion 104 of the prioritized audio feed.

According to certain example implementation, an audio stream (for example, the modified second prioritized audio feed 116) may be set to playback at 1.5 times faster than normal speed, or 50% faster. In another example implementation, one or more of the audio streams may be set to play back at various speeds or time compression ratios (for example 75% of the nominal time, 85%, or configurable, etc.). In certain example embodiments, the system may determine the time compression ratios based, for example, on sensed gaps, priority, etc. One advantage of the combination of delay and time compression is that a human may easily understand the quicker playback. Another advantage for the time compression is that the time gap 106 may be shorter.

According to example embodiments of the disclosed technology, various time compression techniques may be utilized. For example, digital signal processing techniques may utilized to decimate digital signals in order to speed up playback. In other example embodiments, sampling rate variations may be utilized. In other example embodiments, pitch compensation may be utilized.

Figure 2:
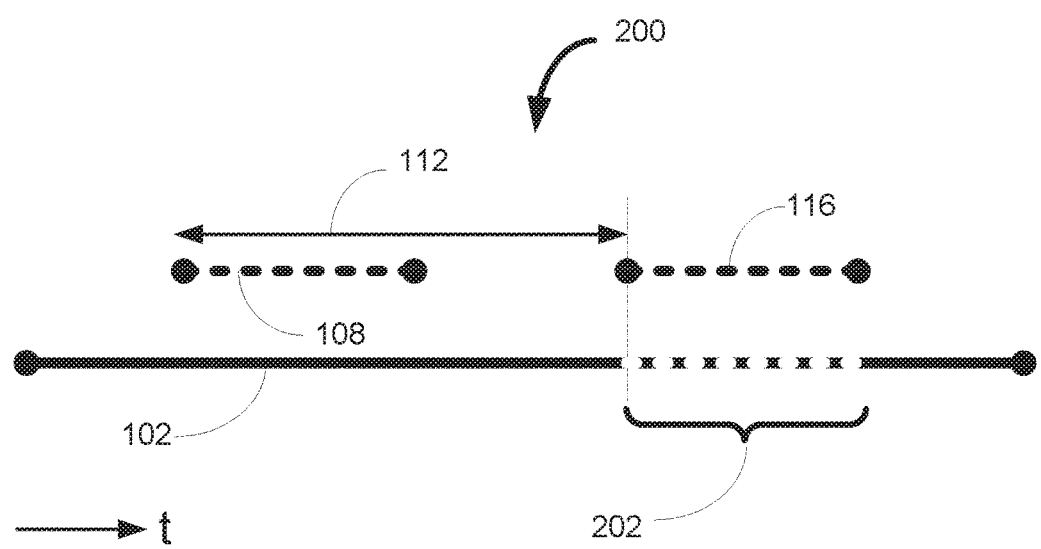
FIG. 2 is another illustrative diagram 200 depicting a delay of a second prioritized audio feed according to an example implementation of the disclosed technology.

FIG. 2 is another illustrative diagram depicting a delay 112 of a second prioritized audio feed 108 according to an example implementation of the disclosed technology, in which a timeout (or other parameter) may have been exceeded without detection of a gap in the first prioritized audio feed 102. In this example embodiment, second prioritized audio feed 108 may have been delayed for as long as possible, or until a timeout occurred, or until some other parameter, such as a change in GPS coordinates may have occurred. In one example embodiment, the delayed second prioritized audio feed 116 may "collide" with the first prioritized audio feed 102 in an overlapping portion 120. However, according to certain example limitations of the disclosed technology, the collision may be mitigated by various techniques describe previously, including, but not limited to, temporary re-prioritization, signal rerouting to other speakers, for example, time compressing, and or adjustments of the various volumes of the two competing audio channels. In one example embodiment, when two or more channels overlap, as depicted in the overlapping portion 120 of FIG. 2, a first prioritized audio feed 102 may be sent to one speaker channel, while the overlapping second prioritized audio feed 116 may be sent to another speaker channel. According to an example implementation of the disclosed technology, relative signal levels or volumes may be adjusted according to predetermined priority assignments. According other example implementations of the disclosed technology, additional information may be utilized to prioritize the various audio feeds, as will be discussed below in reference to FIG. 5.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

FIG. 3 depicts a block diagram of an illustrative computing device 300 according to an example implementation. Certain aspects of FIG. 3 may be embodied in a mobile device. Various implementations and methods herein may be embodied in non-transitory computer readable media for execution by a processor. It will be understood that the computing device 300 is provided for example purposes only and does not limit the scope of the various implementations of the communication systems and methods.

The computing device 300 of FIG. 3 includes one or more processors where computer instructions are processed. The computing device 300 may comprise the processor 302, or it may be combined with one or more additional components shown in FIG. 3. For example, in one example embodiment, the computing device 300 may be the processor 302. In yet other example embodiments, the computing device 300 may be a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

The computing device 300 may include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display 350 that is not necessarily physically connected to the mobile computing device. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to the external/remote display 350.

In an example implementation, the network connection interface 312 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USE port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display 350 that is not necessarily connected to the mobile computing device. In one example, a desktop monitor may be utilized for mirroring or extending graphical information that may be presented on a mobile device. In another example, the display interface 304 may wirelessly communicate, for example, via the network connection interface 312 such as a Wi-Fi transceiver to the external/remote display 350.

The computing device 300 may include a keyboard interface 306 that provides a communication interface to a keyboard. In one example implementation, the computing device 300 may include a presence-sensitive display interface 308 for connecting to a presence-sensitive display 307. According to certain example implementations of the disclosed technology, the presence-sensitive display interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the presence sensitive display interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using an output device 317, such as a speaker, headphones, etc. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (110), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the computing device 300 includes a power source 330 that provides an appropriate alternating current (AC) or direct current (DC) to power components. According to an example implementation, the computing device 300 includes and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

Figure 4:
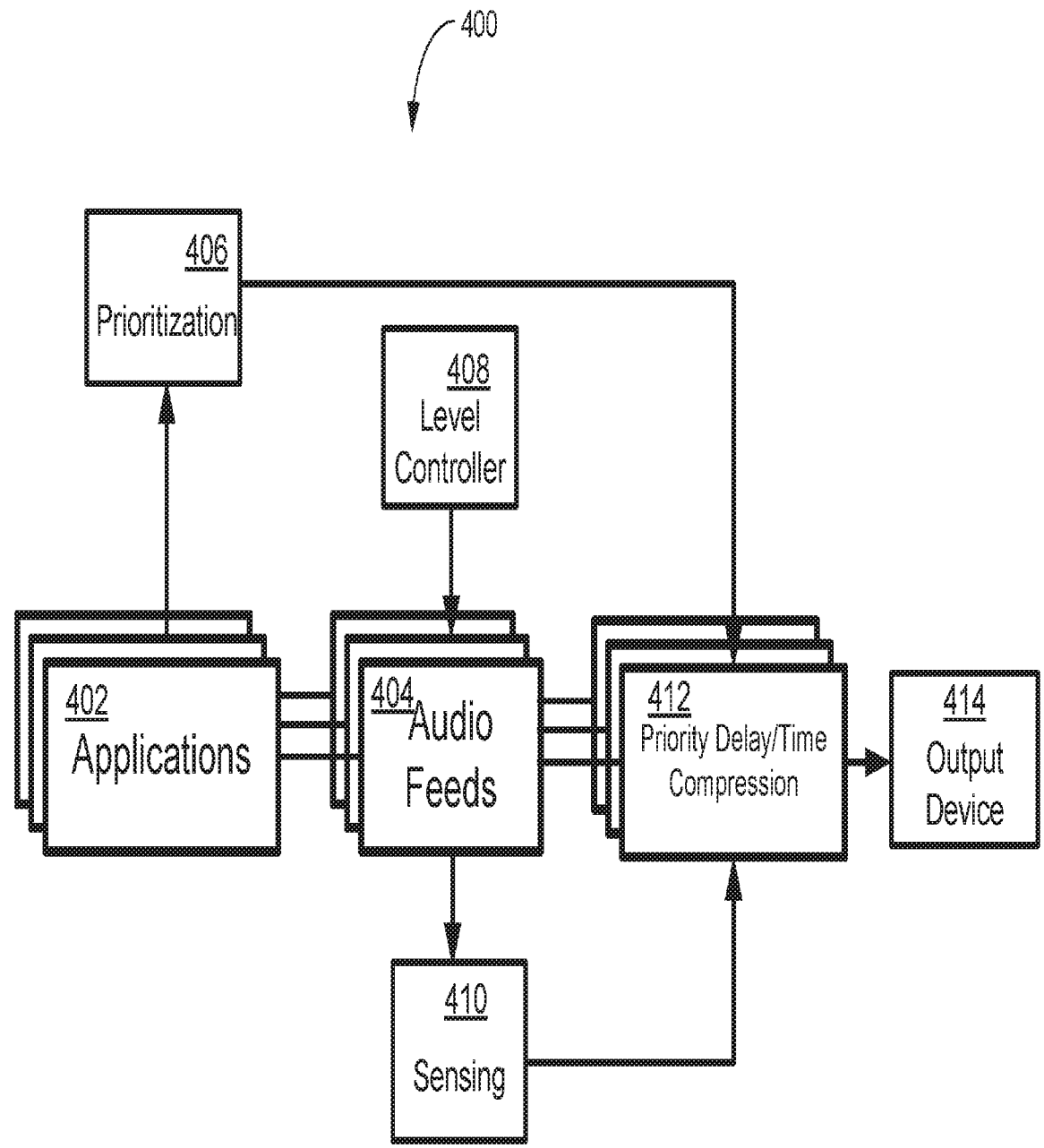
FIG. 4 is a block diagram of an audio feed processing system 400, according to an example implementation of the disclosed technology.

FIG. 4 is a block diagram of an audio feed processing system 400, according to an example implementation of the disclosed technology. In an example embodiment, a plurality of applications 402 may provide a corresponding plurality of audio feeds 404 that, in traditional systems, may compete with each other for output on a single output device 414. In accordance with example implementations of the disclosed technology, the audio feeds 404 may be sensed with a sensing module 410.

In certain example embodiments of the disclosed technology, a prioritization module 406, may be utilized to assign various levels of priority to the applications 402. In certain example embodiments, prioritization 406, may be case specific, as indicated in the examples presented previously. In accordance with an example embodiment of the disclosed technology, a level controller 408, may be utilized to adjust signal levels, such as volume of the one or more audio feeds. In accordance with an example embodiment of the disclosed technology, based on the prioritization 406 and/or sensing 410 of the audio feeds 404, one or more priority to delays 412 may be applied to the audio feeds 404. According to certain example embodiments, the coordination of the various audio feeds 404 from the associated applications 402 may be coordinated by way of the various prioritization 406, sensing 410, level control 408, and priority delay 412 for sending to the output device 414.

Figure 5:
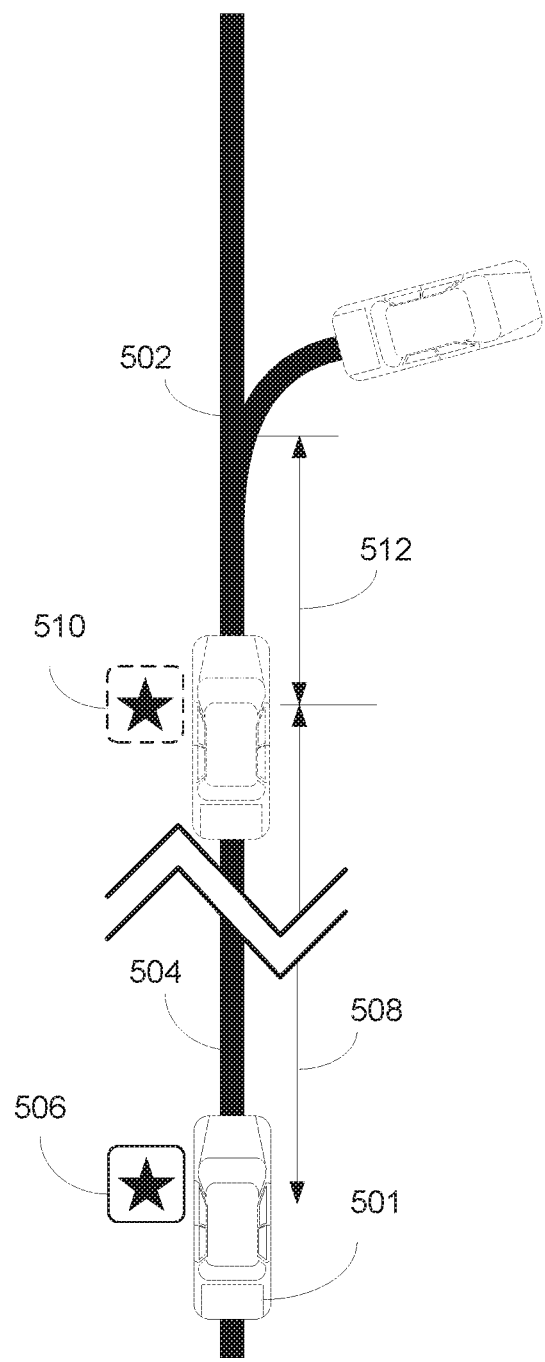
FIG. 5 is an illustrative diagram 500 depicting a delay of a navigation notification, according to an example implementation of the disclosed technology.

FIG. 5 is an illustrative diagram depicting a delay of a navigation notification, according to an example implementation of the disclosed technology. In this illustrative example, a vehicle 501 may be traveling down a road 504. In this example, a first prioritized audio feed may be currently occupying the output. For example, a telephone conversation may be occurring, or music and maybe playing which, according to an example implementation, may have been set by the user or by default settings, or by other intelligent systems to have a higher priority than the navigation notification. The illustrative diagram indicates a notification 506, available from the navigation notification system. For example, the notification may be prompting the driver for taking an exit 502 in two miles. According to an example implementation of the disclosed technology, the notification 506 may be delayed for a certain period of time, or a certain distance 508. For example, if the vehicle 501 comes within a certain range 512 of the exit 502, the delay notification 510 may then take priority over a telephone conversation or music, and may alert the driver of the impending exit 502.

Figure 6:
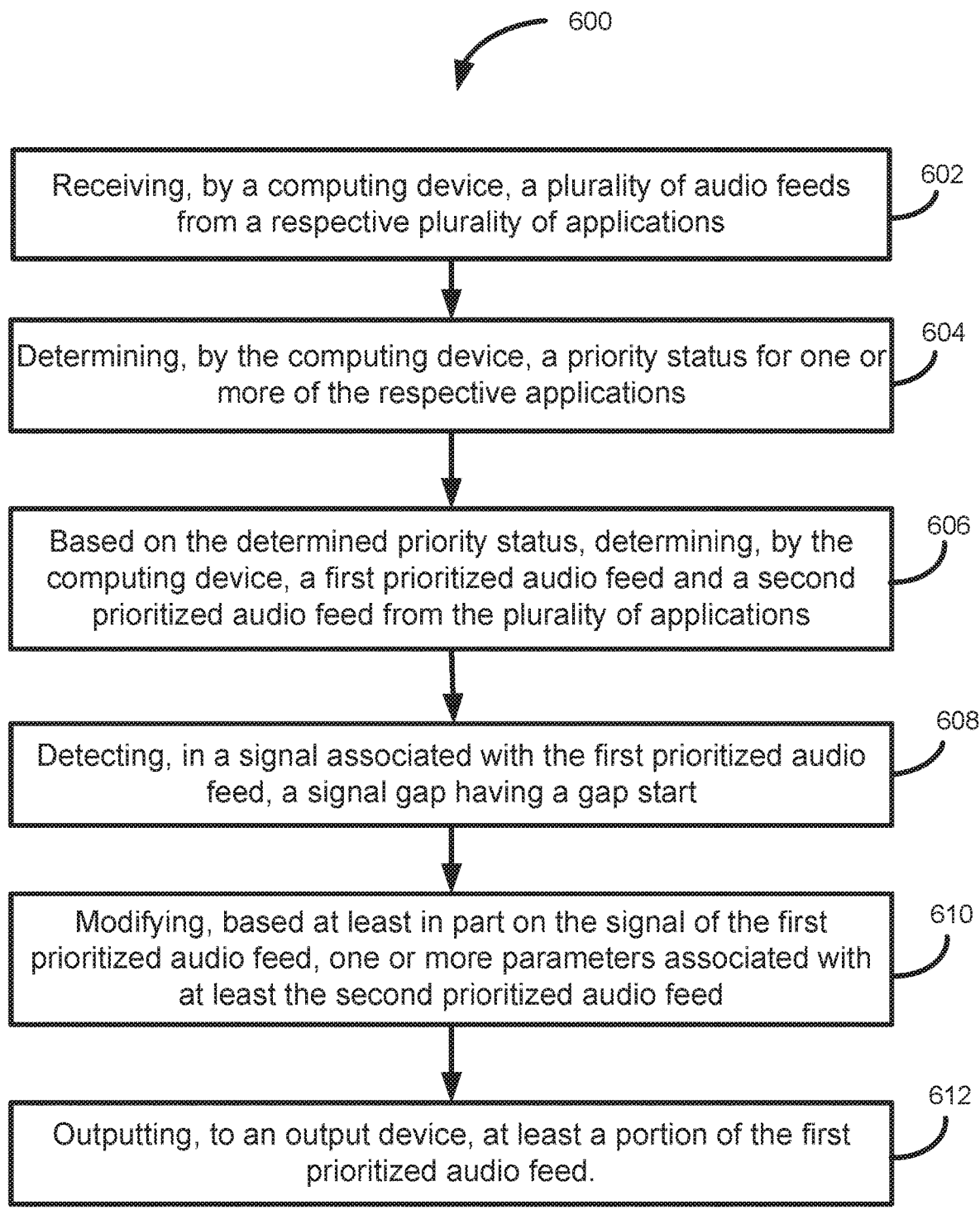
FIG. 6 is a flow diagram of a method 600 according to an example implementation.

An example method 600 for handling application notifications will now be described with reference to the flowchart of FIG. 6. The method 600 starts in block 602, and according to an example implementation includes receiving, by a computing device, a plurality of audio feeds from a respective plurality of applications. In block 604, the method 600 includes determining, by the computing device, a priority status for one or more of the respective applications. In block 606, the method 600 includes determining, based on the determined priority status, a first prioritized audio feed and a second prioritized audio feed from the plurality of applications. In block 608, the method 600 includes detecting, in a signal associated with the first prioritized audio feed, a signal gap having a gap start. In block 610, the method 600 includes modifying, based at least in part on the signal of the first prioritized audio feed, one or more parameters associated with at least the second prioritized audio feed. In block 612, the method 600 includes outputting, to an output device, at least a portion of the first prioritized audio feed.

In certain example implementations, modifying the one or more parameters may include modifying the second prioritized audio feed by applying a time delay to coincide with the detected gap start in the first prioritized audio feed. In certain example implementations, modifying the one or more parameters may include detecting, in the first prioritized audio feed, a signal gap duration of greater than or equal to a predetermined gap period, and in response to detecting the signal gap duration, outputting, to the output device, the modified second prioritized audio feed.

An example implementation may include detecting a duration of the second prioritized audio feed, and in response to detecting that the duration of the second prioritized audio feed is greater than the signal gap duration associated with the first prioritized audio feed, reducing the signal (for example, an audible signal level) of the modified second prioritized audio feed for at least the portion of the modified second prioritized audio feed that extends beyond the signal gap duration.

An example implementation may include detecting a duration of the second prioritized audio feed, and in response to detecting that the duration of the second prioritized audio feed is greater than the signal gap duration associated with the first prioritized audio feed, modifying a signal of the first prioritized audio feed for at least the portion of the first prioritized audio feed that coincides with at least a portion of the second prioritized audio feed, and outputting, to the output device, at least a portion of the modified first prioritized audio feed.

Certain example implementation may include receiving, by the computing device, one or more requests from the plurality of respective applications to utilize an audio channel associated with the computing device, and prioritizing the plurality of audio feeds in the order in which the requests are received. According to certain example implementations, modifying, based at least in part on the signal of the first prioritized audio feed, includes modifying in response to a signal reduction (for example an audible signal level reduction) greater than about a 3 dB. In certain implementations, the signal reduction comprises a reduction in a root-mean-squared (RMS) value of the signal over a predetermined reduction period.

According to example implementations, certain technical effects can be provided, such as creating certain systems and methods that provide handing of application notifications so that two or simultaneous signal streams may be separated, delayed, etc. to enhance comprehension of the signal stream by a user.

In example implementations of the disclosed technology, the computing device 300 may include any number of hardware and/or software applications that are executed to facilitate any of the operations. In example implementations, one or more I/O interfaces may facilitate communication between the computing device 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 300 with more or less of the components illustrated in FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A method comprising:
  receiving, from one or more processors, a plurality of audio feeds from a respective plurality of applications, wherein the plurality of applications comprise software applications simultaneously running on a computing device;

determining, by the one or more processors, a priority status for two or more of the plurality of applications;

determining, by the one or more processors based on the determined priority status, a first prioritized audio feed and a second prioritized audio feed from the plurality of applications;

time compressing, by the one or more processors, the second prioritized audio feed;

outputting, by the one or more processors, the first prioritized audio feed for playback on a first output device; and outputting, by the one or more processors, a notification indicating the compressed second prioritized audio feed to at least one of the first output device or a second output device.

2. The method of claim 1, wherein the notification indicating a second prioritized audio feed includes one or more of (i) a vibration, (ii) a tone, (iii) a notification on a display of the computing device, or (iv) a partial mute.

3. The method of claim 1, wherein when a gap is detected in the first prioritized audio feed, the notification indicating the second prioritized audio feed is the time compressed second prioritized audio feed.

4. The method of claim 1, wherein time compressing the second prioritized audio feed includes at least one of (i) decimating the second prioritized audio feed, (ii) varying a sampling rate of the second prioritized audio feed, or (iii) compensating a pitch of the second prioritized audio feed.

5. The method of claim 1, wherein outputting the notification indicating a second prioritized audio feed is output to the second output device.

6. The method of claim 1, further comprising outputting, by the one or more processors, the second prioritized audio feed to the second output device.

7. A non-transitory computer-readable medium storing instructions executable by a processor for performing a method comprising:

receiving, from one or more processors, a plurality of audio feeds from a respective plurality of applications, wherein the plurality of applications comprise software applications simultaneously running on a computing device;

determining, by the one or more processors, a priority status for two or more of the plurality of applications;

determining, by the one or more processors based on the determined priority status, a first prioritized audio feed and a second prioritized audio feed from the plurality of applications;

time compressing, by the one or more processors, the second prioritized audio feed;

outputting, by the one or more processors, the first prioritized audio feed for playback on a first output device; and outputting, by the one or more processors, a notification indicating the compressed second prioritized audio feed to at least one of the first output device or a second output device.

8. The non-transitory computer-readable medium of claim 7, wherein the notification indicating a second prioritized audio feed includes one or more of (i) a vibration, (ii) a tone, (iii) a notification on a display of the computing device, or (iv) a partial mute.

9. The non-transitory computer-readable medium of claim 7, wherein when a gap is detected in the first prioritized audio feed, the notification indicating the second prioritized audio feed is the time compressed second prioritized audio feed.

10. The non-transitory computer-readable medium of claim 7, wherein time compressing the second prioritized audio feed includes at least one of (i) decimating the second prioritized audio feed, (ii) varying a sampling rate of the second prioritized audio feed, or (iii) compensating a pitch of the second prioritized audio feed.

11. The non-transitory computer-readable medium of claim 7, wherein outputting the notification indicating a second prioritized audio feed is output to the second output device.

12. The non-transitory computer-readable medium of claim 7, further comprising outputting, by the one or more processors, the second prioritized audio feed to the second output device.

13. A system comprising:
one or more processors, the one or more processors configured to:
receive a plurality of audio feeds from a respective plurality of applications, wherein the plurality of applications comprise software applications simultaneously running on a computing device;
determine a priority status for two or more of the plurality of applications;
determine a first prioritized audio feed and a second prioritized audio feed from the plurality of applications based on the determined priority status;
time compress the second prioritized audio feed;
output the first prioritized audio feed for playback on a first output device; and
output a notification indicating the compressed second prioritized audio feed to at least one of the first output device or a second output device.

14. The system of claim 13, wherein the notification indicating a second prioritized audio feed includes one or more of (i) a vibration, (ii) a tone, (iii) a notification on a display of the computing device, or (iv) a partial mute.

15. The system of claim 13, wherein when a gap is detected in the first prioritized audio feed, the notification indicating the second prioritized audio feed is the time compressed second prioritized audio feed.

16. The system of claim 13, wherein time compressing the second prioritized audio feed includes at least one of (i) decimating the second prioritized audio feed, (ii) varying a sampling rate of the second prioritized audio feed, or (iii) compensating a pitch of the second prioritized audio feed.

17. The system of claim 13, wherein outputting the notification indicating a second prioritized audio feed is output to a second output device.

* * * * *